Sept. 19, 1961 H. Y. KUHL ET AL 3,000,528
EGG TRAY

Original Filed March 5, 1958 2 Sheets-Sheet 1

HENRY Y. KUHL
PAUL R. KUHL
*INVENTORS*

BY *Albert Sperry*

*ATTORNEY*

HENRY Y. KUHL
PAUL R. KUHL
*INVENTORS*

BY *Albert Sperry*

*ATTORNEY*

3,000,528
EGG TRAY
Henry Y. Kuhl and Paul R. Kuhl, both of
Box 26, Flemington, N.J.
Original application Mar. 5, 1958, Ser. No. 719,374, now Patent No. 2,950,726, dated Aug. 30, 1960. Divided and this application Mar. 17, 1960, Ser. No. 15,658
2 Claims. (Cl. 217—26.5)

This invention relates to egg supporting trays.

In collecting eggs, the poultryman ordinarily places them in a basket which may be formed of wire or otherwise open at the bottom and sides to permit ventilation and cooling of the eggs. The eggs are necessarily arranged irregularly in such baskets with the result that ventilation is not uniform and, of course, the number of eggs is not indicated and may vary considerably due to differences in size and shape of the eggs.

When the eggs are to be washed, the basket containing the eggs is immersed in a bath of circulating detergent liquid, but the circulation is necessarily varied and erratic in each washing operation due to the different and irregular arrangement and varying size of the eggs. Moreover, the total surface of the eggs being washed varies with their number so that either more or less liquid and detergent may be used at one time than another and the duration of the washing operation must be prolonged unduly in order to assure effective washing of the eggs.

After washing, the basket containing the eggs is removed from the washer and drained and the eggs are allowed to dry. However, some water usually is held on the eggs by capillary attraction at the points of contact between the eggs so that water spots are often formed on the eggs. Moreover, in the subsequent handling of the eggs in arranging them for candling and grading or when placing them in an incubator, packing in a crate or cartons or performing other operations, numerous eggs may be cracked or broken.

In accordance with the present invention, these objections to prior egg supporting trays are overcome and means are provided which assure predetermined and orderly arrangement of a definite number of eggs in a manner to establish substantially uniform channels between and about the eggs. As a result, ventilating, washing and drying of the eggs is accomplished more readily and in a controlled manner which reduces the time of contact of the eggs with the washing liquid and increases the efficiency of the washing operation. Moreover, the handling of individual eggs is reduced to a minimum so that cracking, checking and damage to the eggs is materially reduced.

These results are preferably attained by providing egg holding trays having a predetermined number of egg receiving cavities therein arranged in rows or other regular order. The trays are preferably formed to rest one upon another in a holder so as to support the eggs in spaced relation and establish definite channels through which washing liquid may be circulated in a controlled and efficient manner for washing with a predetermined amount of liquid and in a minimum length of time. The trays are further formed to permit rapid and complete drainage of the washing liquid from the eggs and further permit placement of the eggs in crates, incubators and elsewhere without handling of the eggs themselves. In this way, cracking or damaging of eggs is reduced and the condition of the eggs is not impaired.

A particular object of the invention is to provide a novel type of egg holding tray which facilitates the passage of air and washing liquid into and out of contact with eggs supported on the trays.

A specific object of the invention is to provide an egg supporting tray with egg receiving cavities therein which are provided with surfaces and openings arranged to afford a mild rubbing contact of the eggs with the surfaces and edges of the openings upon circulation of washing liquid about the eggs on the trays.

These and other objects and features of the present invention will appear from the following description thereof in which reference is made to the figures of the accompanying drawing.

Figure 1:
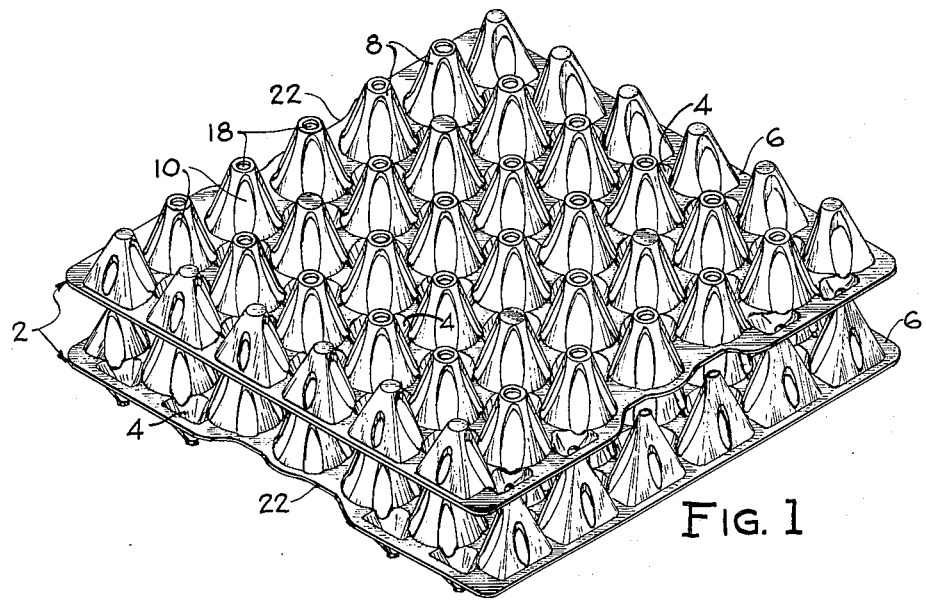
FIG. 1 is a perspective showing a plurality of typical egg holding trays embodying the present invention arranged in stacked relation.
Figure 2:
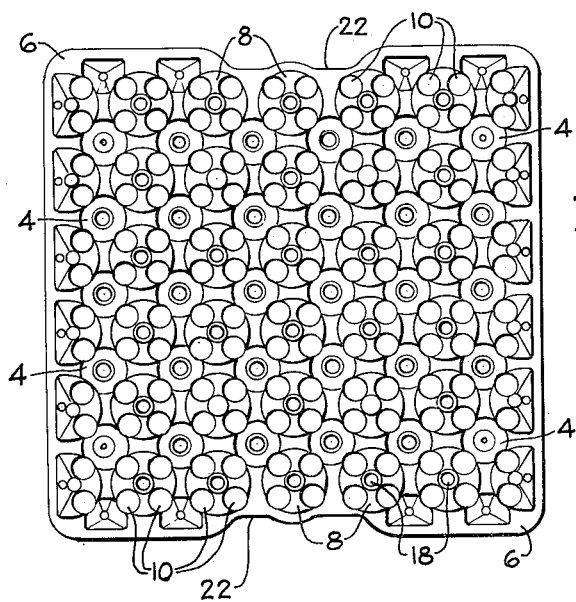
FIG. 2 is a plan view of one of the trays illustrated in FIG. 1.
Figure 3:
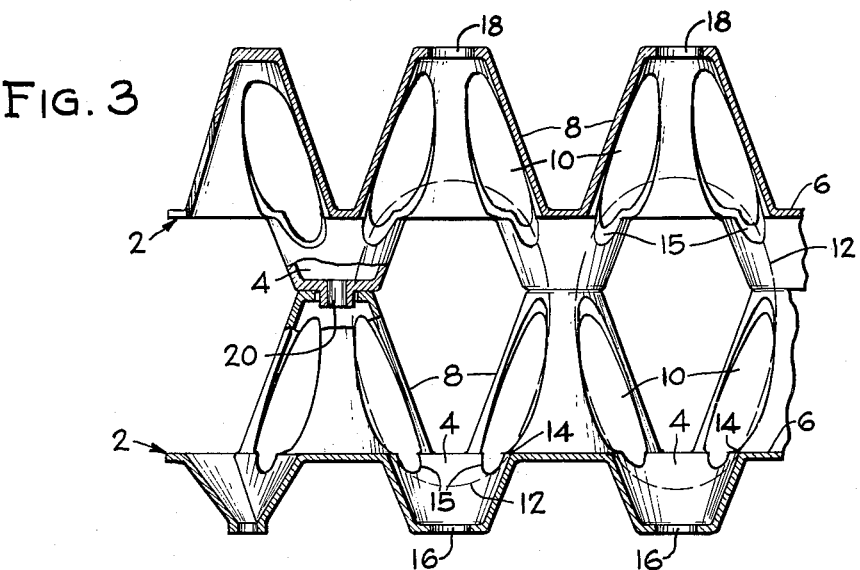
FIG. 3 is an enlarged sectional view of a portion of the assembled trays shown in FIG. 1.

In that form of the invention shown in FIGS. 1 to 3, the egg holding trays 2 are shown as being provided with egg receiving cavities 4 arranged in predetermined number and orderly relation projecting below the rim 6 of the tray. Egg supporting projections 8 extend upward from the plane of the rim 6 of the tray and each projection is formed with openings 10 in the side walls thereof which face toward the cavities 4. The openings 10 extend from points adjacent the plane of the tray to points adjacent the tops of the projections and accupy the major portion of the side walls of the projections so that liquid may circulate freely through the openings 10 into and out of contact with eggs supported in the egg receiving cavities 4 of the tray. Since the openings 10 in the projections 8 face toward the cavities 4, the eggs are not supported by the side walls of the projections but instead the eggs 12 are supported adjacent one end by the circular edges 14 of the cavities 4. Nevertheless the sides of the eggs are adjacent and may engage the edges of the openings 10 in the surrounding projections 8 of the tray upon tilting of the eggs. The eggs are thus capable of limited tilting movement about the rims 14 of the cavities 4 so as to brush against the sides of the openings 10 to aid in the cleaning thereof. The cavities and projections are of such dimensions as to receive and hold either large or small eggs in an orderly arrangement within the tray.

The bottom of each of the cavities 4 is provided with a drainage opening 16, whereas the tops of the projections 8 are provided with similar drainage openings 18. Therefore, when the trays are arranged in stacked relation as shown in FIGS. 1 and 3, water or air can pass freely through the drainage openings assuring ample circulation and preventing the retention of water by the trays or about the eggs when the trays and eggs are removed from the washer. Moreover, the openings 10 in the side walls of the projections 8 may extend downwardly past the plane 6 of the sheet from which the tray is formed and into the cavities 4 in which the eggs are placed. The eggs then are exposed for ventilation or washing by the circulation of fluid about the eggs both above and below the plane of the tray. Since such extended openings 10 in the projection 8 face toward the cavities 4 in the tray they serve to present interruptions or breaks in the rim 14 upon which the eggs rest when placed in the cavities 4. As a result, liquid may drain downward from the upper portions of the eggs to the cavities 4 through the interruptions in the rim 14 for drainage from the openings 16. The liquid therefore will not be trapped upon the upper surface of the tray by sealing contact of the eggs with continuous or uninterrupted rims about the upper edges of the cavities. However, certain of the downwardly projecting cavities 4 are provided with projections or nipples 20 designed to fit within the drainage openings 18 whereby one tray may be placed in accurate stacked relation with respect to another and held against lateral displacement. The cavities in the tray are preferably arranged in parallel rows with one more row extending in one direction than the other. Thus, the trays illustrated in FIG. 1 have five rows of cavities extending in one direction and six rows of cavities extending in the direction at right angles thereto. The trays can then be turned at 90 degrees from adjacent upper and lower trays in stacking one upon another whereby the downwardly facing hollow interior of the projections 8 on an upper tray are brought into registry with the upwardly facing cavities 4 of the tray beneath. In this way the upper ends of the eggs are positioned within the downwardly facing interior of the projections on the tray above, and the number and arrangement of the upwardly and downwardly facing cavities are the same and they are brought into registry while the rims 6 of the trays are in vertical alignment. Each tray is formed to receive and hold a definite number, say thirty eggs, and the marginal rims 6 of the tray may be formed with cut out portions 22 which serve as finger openings, allowing each tray to be grasped at its edges for handling thereof. The eggs are thus handled in groups of thirty and in collecting the eggs, the number of eggs need not be counted since the number of trays arranged within a basket or carrier designed to receive the trays will indicate the number of eggs which have been collected.

During the washing of eggs when using the trays of the present invention, the eggs 12 are ordinarily moved slightly and rocked about the rims 14 of the cavities 4 by the liquid flowing through the openings 10 into contact with the eggs. The sides of the eggs are thus brought into contact with the edges of the openings 10 affording a mild scraping action which aids in removing dirt or solid matter from the surface of the eggs during the washing operation. The controlled and organized flow of liquid through and about the eggs and the known number of eggs which are contained within the carrier render it possible to use a predetermined and accurate amount of liquid and detergent in washing the eggs. Furthermore, the arrangement of the eggs and the openings in the projections and recesses in the trays assure the most efficient circulation of the liquid about the eggs and into contact with the surface thereof. The length of time required to wash the eggs can therefore be reduced to a minimum, whereas every single egg is subjected to the same washing action by the detergent liquid circulated within the casing of the washer.

Upon conclusion of a washing operation, the trays are removed whereupon the washing liquid drains freely and completely from the eggs preventing the retention of liquid on the eggs. The free circulation of air through the openings in the projections and recesses further serves to assure rapid drying of the eggs so that water spots are not formed on the eggs and all danger of rotting and spoilage of the eggs due to excessive moisture is avoided.

The washed eggs which are still supported by the egg holding trays can then be transferred directly in the trays to incubators, egg candling and grading equipment and if desired, the trays containing the eggs may be inserted directly into crates for shipping. The eggs therefore need not be handled individually at any time after they are first collected. In actual practice, the amount of breakage, checking and cracking of eggs is materially reduced by the reduced handling thereof, whereas the ventilating, washing and drying of the eggs is rendered more uniform and rapid by the orderly positioning and individual support thereof on the trays.

Figure 4:
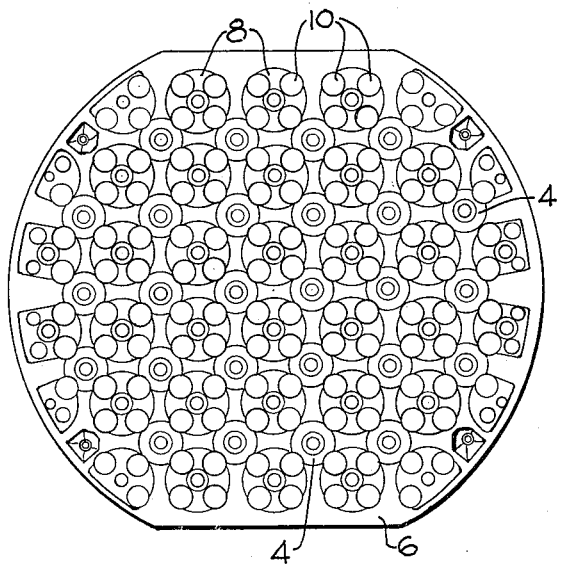
FIG. 4 is a plan view illustrating an alternative form of egg holding tray embodying the present invention.

While the trays are preferably generally rectangular in shape, the trays may be circular in form as shown in FIG. 4. Such trays may be employed with conventional circular egg collecting baskets by stacking the trays one upon another in the basket. Further, the basket containing the trays with a definite number of eggs held thereon and arranged in a spaced and orderly manner can be immersed in a circular form of egg washer. However, the trays may be otherwise constructed to support and maintain the eggs in a uniform arrangement affording maximum freedom of circulation of air and liquid about the eggs.

In the preferred form of the invention, the egg holding trays are formed of stiff or substantially rigid plastic material which prevents sagging or displacement of the trays during use and which further prevents deterioration of the tray by the action of the washing liquid circulated in contact therewith. However, if desired, the trays may be made of aluminum or other sheet metal material or they may be formed of wire or the like constructed and arranged in a suitable fashion to support the eggs in an orderly arrangement providing channels therebetween.

These and other changes and modifications may be made in the form, construction and arrangement of the various elements employed, and in view thereof, it should be understood that the particular embodiments of the invention shown in the drawing and described above are intended to be illustrative only and are not intended to limit the scope of the invention.

This application is a division of of our copending application Serial No. 719,374, filed March 5, 1958, now Patent No. 2,950,726.

We claim:

1. An egg supporting tray formed of a sheet of stiff material which is not substantially affected by the action of egg washing liquid, said sheet having a plurality of egg receiving cavities therein extending downward below the plane of the sheet and having openings in the bottoms thereof, the upper edges of said cavities presenting egg supporting rims upon which eggs placed in the cavities may rest, said sheet further having a plurality of projections extending upward above the plane of the sheet about said cavities, said projections having elongated openings therein extending from points adjacent the plane of the sheet to points near the upper portions of said projections and occupying the major portion of the side walls of the projections, said openings in the projections being positioned on the sides of the projections which face toward said cavities so that fluid may circulate through said openings into and out of contact with eggs supported by the rims at the edges of the cavities.

2. An egg supporting tray as defined in claim 1 wherein the openings in the side walls of the projections extend below the plane of the sheet and into the side walls of the cavities and serve to present interruptions in the egg supporting rims at the upper edges of the cavities through which fluid may flow from above the plane of the sheet into the cavities and out through the openings in the bottoms of the cavities.

References Cited in the file of this patent
UNITED STATES PATENTS

| | | |
|---|---|---|
| 915,177 | Hilliker | Mar. 16, 1909 |
| 1,956,955 | Kronenberger | May 1, 1934 |
| 2,045,771 | Graham | June 30, 1936 |
| 2,141,112 | Neupert | Dec. 20, 1938 |